(12) United States Patent
Coons et al.

(10) Patent No.: US 6,844,518 B1
(45) Date of Patent: Jan. 18, 2005

(54) HOLE-DRILLING GUIDE AND METHOD

(75) Inventors: Todd Coons, Casa Grande, AZ (US); Edward Pietraszkiewicz, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/743,517

(22) Filed: Dec. 22, 2003

(51) Int. Cl.[7] .......................... B23H 1/04; B23H 7/26; B23H 9/10; B23H 9/14
(52) U.S. Cl. ................... 219/69.15; 219/69.11
(58) Field of Search ............... 219/69.11, 69.15, 219/69.17; 205/665

(56) References Cited

U.S. PATENT DOCUMENTS

| | | | | |
|---|---|---|---|---|
| 3,995,134 A | * | 11/1976 | Dudden | .................. 219/69.15 |
| 4,721,838 A | * | 1/1988 | Abdukarimov et al. | .. 219/69.15 |
| 5,687,205 A | * | 11/1997 | Matsumoto et al. | ........ 376/260 |
| 6,225,589 B1 | * | 5/2001 | Bartok | .................... 219/69.15 |
| 6,627,833 B2 | * | 9/2003 | Varsell et al. | ............ 219/69.11 |
| 6,759,621 B2 | * | 7/2004 | Varin | ...................... 219/69.15 |

FOREIGN PATENT DOCUMENTS

| | | | | |
|---|---|---|---|---|
| JP | 2-116428 A | * | 5/1990 | .............. 219/69.17 |
| JP | 8-108322 A | * | 4/1996 | |

* cited by examiner

Primary Examiner—Geoffrey S. Evans
(74) Attorney, Agent, or Firm—Colin L. Cini

(57) ABSTRACT

A hole-drilling guide for directing a flexible hole-drilling instrument includes; a body made of an electrically insulating material, at least one inlet aperture penetrating a face of the body, at least one exit aperture penetrating a face of the body and a hollow, nonlinear raceway linking the inlet and exit apertures.

7 Claims, 5 Drawing Sheets

FIG.4
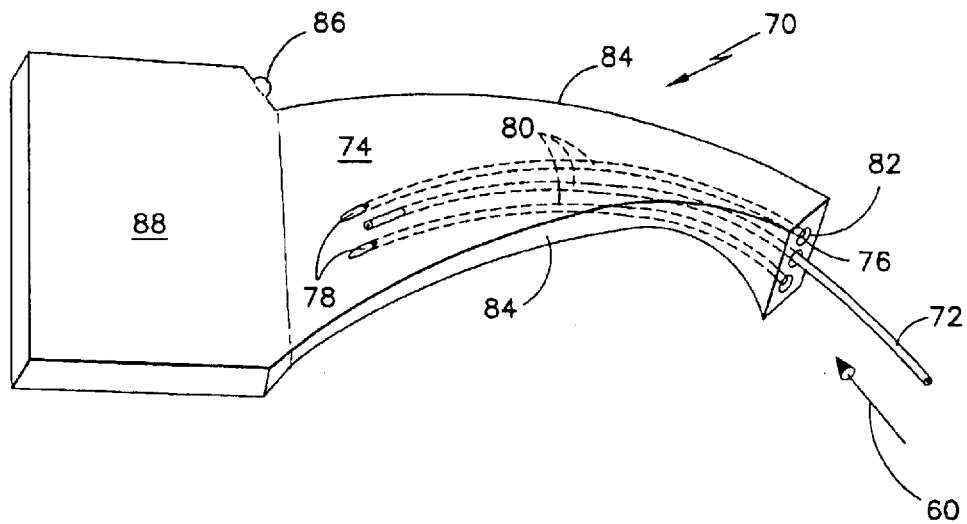
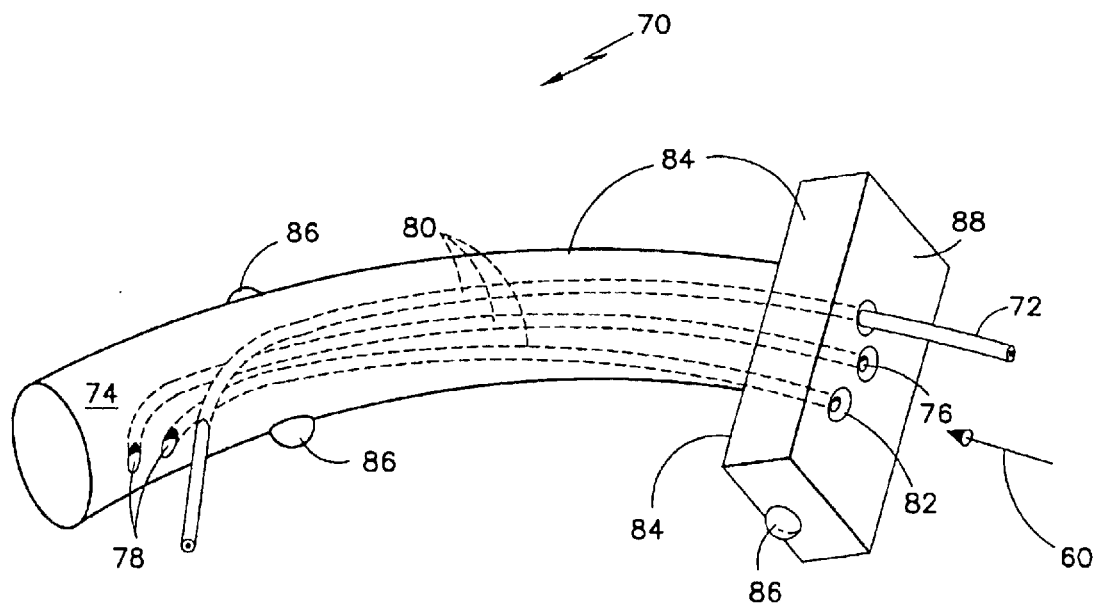
FIG.5

HOLE-DRILLING GUIDE AND METHOD

CROSS-REFERENCE TO RELATED APPLICATIONS

This application discloses subject matter related to co-pending US application "COOLED TURBINE VANE CLUSTER" (APPLICANT REFERENCE NUMBER EH-11065). The disclosure of which is incorporated herein by reference.

STATEMENT REGARDING FEDERALLY SPONSORED RESEARCH OR DEVELOPMENT

This invention was made with Government support under N00019-02-C-3003 awarded by the United States Navy. The Government has certain rights in this invention.

BACKGROUND OF THE INVENTION (1) Field of the Invention

The invention relates to an apparatus and EDM method of drilling holes into surfaces without a line of sight from the drilling equipment to the hole location, and more particularly into surfaces of a cast vane cluster.

(2) Description of the Related Art

A gas turbine engine includes a compressor for directing a primary fluid stream axially rearward, through a combustor and into a turbine. The turbine extracts power from a primary fluid stream and transmits the power through a shaft to rotate the forward-mounted compressor. A portion of the primary fluid stream is also directed to one or more secondary fluid streams for use in cooling components of the gas turbine engine. Disposed within the turbine section are alternating, annular stages of rotating blades and stationary vanes. The blades and vanes are disposed circumferentially about a central, longitudinal axis of the gas turbine engine.

Individual turbine vanes are comprised of an inner platform, an outer platform and an airfoil spanning radially outward from the inner platform to the outer platform. The airfoil contains a forward facing leading edge and a rearward facing trailing edge. The airfoil is staggered on the platforms in relation to the primary fluid stream direction, with the airfoil trailing edges of adjacent vanes forming an overlapping array. Together, the platforms and airfoils of adjacent vanes delineate a duct for directing the primary fluid stream rearward. The duct area generally converges in the rearward direction.

Vanes are typically investment cast of high-strength Nickel or Cobalt alloys and may contain multiple airfoils within a single casting. Vane castings with multiple airfoils are referred to as cast vane clusters and have the advantage of reducing the number of inter-platform interfaces in a turbine stage. Inter-platform interfaces are costly to manufacture and are a source of primary fluid stream leakage, which is detrimental to the operating efficiency of the gas turbine engine.

In cast vane clusters requiring cooling, one or more hollow passages extend through the interior of the airfoils for directing a secondary fluid stream. A multitude of cooling holes pass through the airfoil walls and into the hollow passages, allowing the secondary fluid stream to discharge into the primary fluid stream. Preferably, the multitude of cooling holes are drilled from the direction of the airfoil trailing edge and at an acute angle to the cast vane cluster surfaces. The drilling direction and angle are necessary to ensure that the secondary fluid stream is discharged in a substantially rearward direction. This optimizes the cooling effectiveness of the secondary fluid stream and reduces aerodynamic losses in the primary fluid stream.

Typically, cooling holes are drilled after a vane cluster casting is made. The standard methods used for drilling cooling holes in cast articles are laser and electrodischarge machining (EDM). Laser drilling methods utilize short pulses of a high-energy beam, an example is shown in U.S. Pat. No. 5,037,183. Electrodischarge machining (EDM) drilling methods pass an electrical charge through a gap between an electrode and a surface, an example is shown in U.S. Pat. No. 6,403,910. Both the laser and the EDM drilling methods require a line of sight from the drilling equipment to the hole location, limiting the surfaces that may be drilled.

Due to the stagger of the airfoils on the platforms of a cast vane cluster, portions of the duct surfaces are obstructed by the airfoil trailing edges and cannot be drilled using conventional laser or EDM drilling methods. What is needed is an apparatus and method of drilling holes into surfaces without a line of sight from the drilling equipment to the hole location.

BRIEF SUMMARY OF THE INVENTION

Provided is an apparatus and an EDM method of drilling holes into surfaces without a line of sight from the drilling equipment to the hole location.

In accordance with a preferred embodiment apparatus, a hole-drilling guide for directing a flexible hole-drilling instrument contains a body, at least one inlet aperture, at least one exit aperture and a hollow, nonlinear raceway joining the inlet and exit apertures.

In accordance with a preferred embodiment hole-drilling method, holes are drilled into surfaces without a line of sight from the drilling equipment to the hole location using the aforementioned hole-drilling guide. The hole-drilling guide is located in proximity to an obstructed area of a surface. A flexible hole-drilling instrument is introduced into an inlet aperture and guided along a nonlinear raceway. Finally, the instrument drills a hole in the surface.

Other features and advantages will be apparent from the following more detailed descriptions, taken in conjunction with the accompanying drawings, which illustrate, by way of example, the principles of a preferred embodiment apparatus and method.

BRIEF DESCRIPTION OF THE SEVERAL VIEWS OF THE DRAWINGS

FIG. 4 is an isometric view of an embodiment of a hole drilling guide.

FIG. 5 is an isometric view of an alternate embodiment of a hole drilling guide.

DETAILED DESCRIPTION OF THE INVENTION

Figure 1:
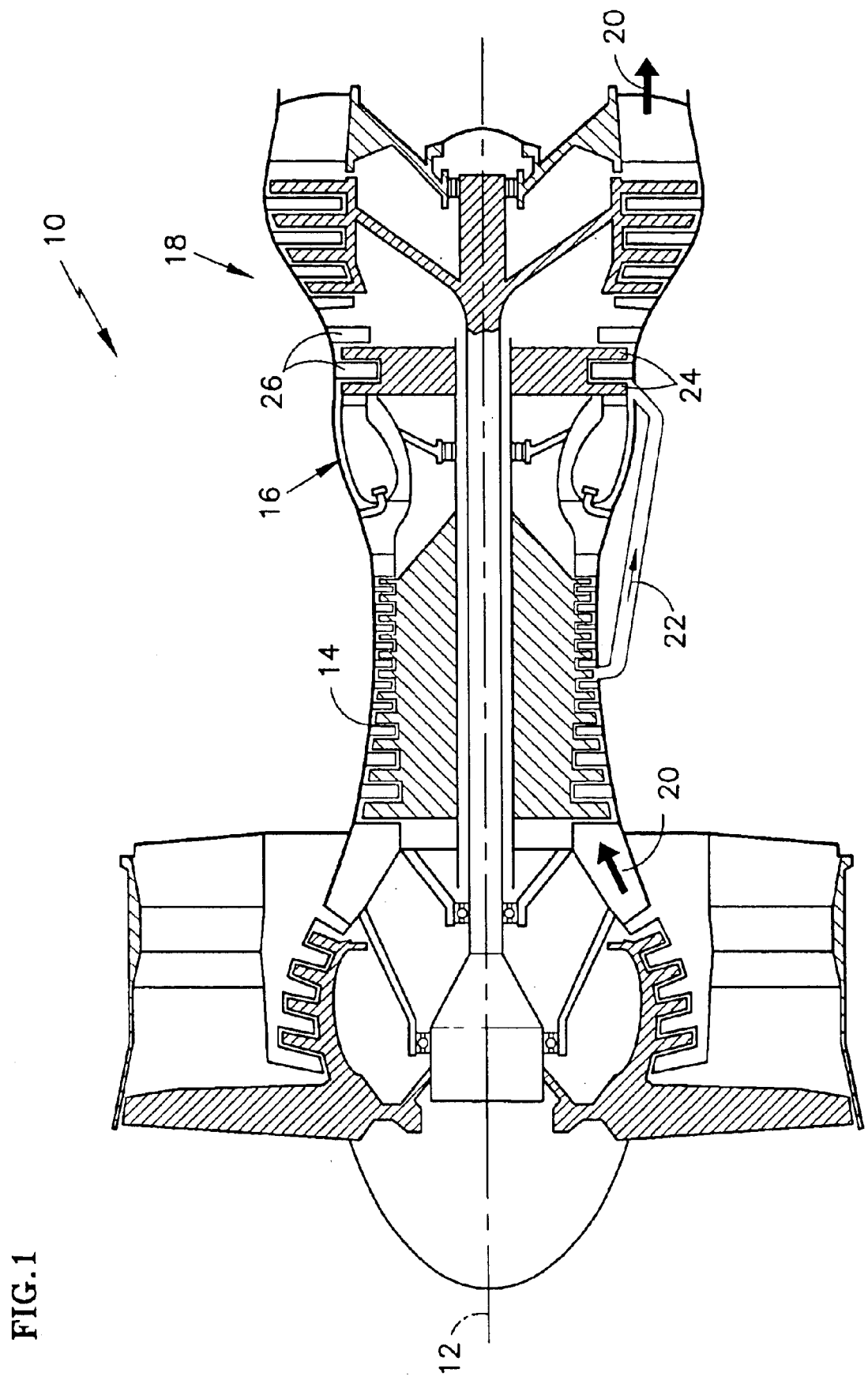
FIG. 1 is a simplified schematic of a gas turbine engine along a longitudinal axis.

A gas turbine engine 10 with a central, longitudinal axis 12 is shown in FIG. 1. The gas turbine engine contains a compressor section 14, a combustor section 16 and a turbine section 18. A primary fluid stream 20 is directed axially rearward from the compressor section 14, through the combustor section 16 and into the turbine section 18. Within the compressor section 14, a portion of the primary fluid stream 20 is directed to one or more secondary fluid streams 22, which bypass the combustor section 16, for use in cooling components within the gas turbine engine 10. The turbine section 18 typically comprises multiple, alternating stages of rotating blades 24 and stationary vanes 26. Multiple vanes may be cast as a single piece, which is typically called a cast vane cluster 32 (shown in FIG. 2).

Figure 2:
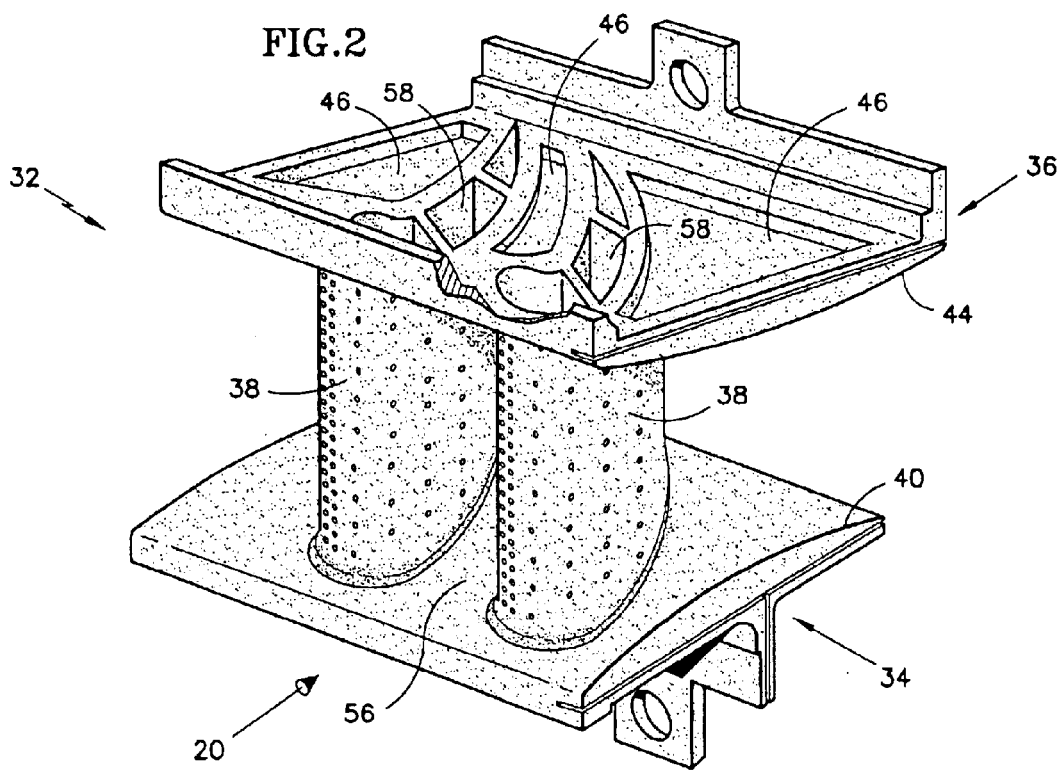
FIG. 2 is an isometric view of a cast vane cluster of the type used in the gas turbine engine of FIG. 1.
Figure 3:
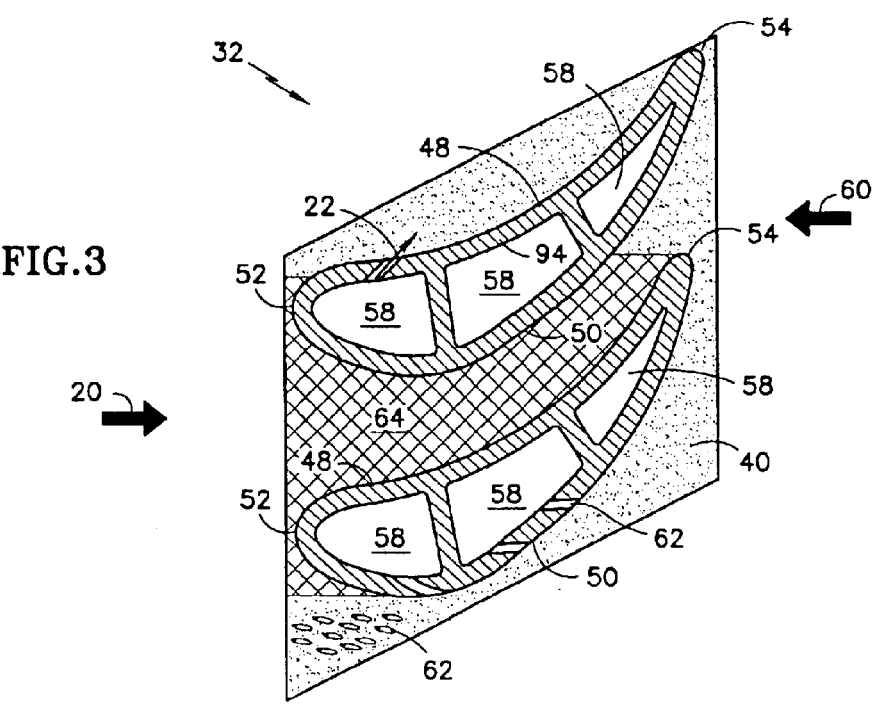
FIG. 3 is a sectional top view of a cast vane cluster of FIG. 2 showing an obstructed surface area.

A cast vane cluster 32 is comprised of an inner platform 34, an outer platform 36 and at least two airfoils 38 spanning radially outward from the inner platform 34 to the outer platform 36. The inner platform 34 has an inner endwall surface 40 facing the airfoils and one or more inboard cavities 42 (shown in FIGS. 7 and 8) opposite the airfoils. The outer platform 36 has an outer endwall surface 44 facing the airfoils and one or more outboard cavities 46 opposite the airfoils. As shown in FIG. 3, each of the airfoils 38 are comprised of a concave fluid directing surface 48, a convex fluid directing surface 50, a forward facing leading edge 52 and a rearward facing trailing edge 54. Collectively, the platform endwall surfaces 40, 44 and airfoil fluid directing surfaces 48, 50 delineate a duct 56, as shown in FIG. 2, for directing the primary fluid stream 20 rearward. One or more hollow passages 58 extend through the interior of the airfoils 38, connecting the inboard 42 and outboard cavities 46, (shown in FIG. 8). In surfaces that have a line of sight from a drilling equipment direction 60, a multitude of cooling holes 62 may be drilled using conventional laser or electrodischarge machining EDM drilling methods.

Shown in FIG. 3 is an obstructed area 64 of duct 56, where no line of sight exists from a drilling equipment direction 60. The obstructed area 64 extends axially across portions of the platform endwall surfaces 40, 44, shown in FIG. 2, and radially across portions of the airfoil fluid directing surfaces 48, 50 (shown in FIG. 3). In obstructed area 64, holes of the proper direction and angle cannot be drilled using conventional laser or electrodischarge machining EDM drilling processes.

FIG. 4 shows an embodiment of a hole-drilling guide 70 for guiding a flexible, hole-drilling instrument 72 to a surface without a line of sight from the hole drilling equipment to a required hole location. The hole-drilling guide 70 comprises a body 74, one or more inlet apertures 76, one or more exit apertures 78 and a hollow, nonlinear raceway 80 connecting each corresponding inlet 76 and exit 78 apertures. Shown in this example are three raceways; however, any number may be used. An inlet aperture 76 may contain a conical, bell-shaped or a similar shaped entrance 82 to simplify insertion of the flexible, hole-drilling instrument 72. The raceways 80 are a similar cross sectional shape as the flexible, hole-drilling instrument 72 and are slightly larger in sectional area. The clearance required between the flexible, hole-drilling instrument 72 and the nonlinear raceway 80 depends on the material of the hole-drilling guide 70 and the degree of curvature of the nonlinear raceway 80. In this example, a radial clearance of approximately 0.004 inch is used. Each of the exit apertures 78 penetrates a substantially conforming face 84 of the hole-drilling guide 70. The position of an exit aperture 78 in relation to an obstructed surface of an article is controlled by the substantially conforming faces 84, and by other locating features such as rolls, pins, tabs, balls, bumps 86. A clamping lug 88 allows the hole-drilling guide 70 to be rigidly secured to an article, once positioned.

FIG. 5 shows an alternate embodiment of a hole-drilling guide. In the embodiment shown, the hole-drilling guide 70 comprises a body 74 and faces 84, which substantially conform to an internal cavity or passage of an article. A clamping lug 88 allows the hole-drilling guide 70 to be rigidly secured to the article, once positioned, and contains one or more inlet apertures 76. One or more exit apertures 78 penetrate the substantially corresponding surfaces 84 and are connected to the inlet apertures 76 by one or more nonlinear raceways 80. Shown in this example are three nonlinear raceways; however, any number may be used.

In each of the above-described embodiments, the flexible, hole-drilling instrument 72 is an EDM electrode. The EDM electrode is formed of a flexible, electrically conductive wire with a diameter of between approximately (0.009–0.016) inches. For noncircular shaped holes, a flexible, electrically conductive foil strip of a comparable dimension may be used. The body 74 of the hole-drilling guide 70 is preferably made of an electrically insulating material using solid freeform fabrication, casting, molding, machining or any other suitable technique. Alternately, the body 74 may be formed of an electrically conductive material and the nonlinear raceways 80 may be coated with an electrically insulating material.

Figure 6:
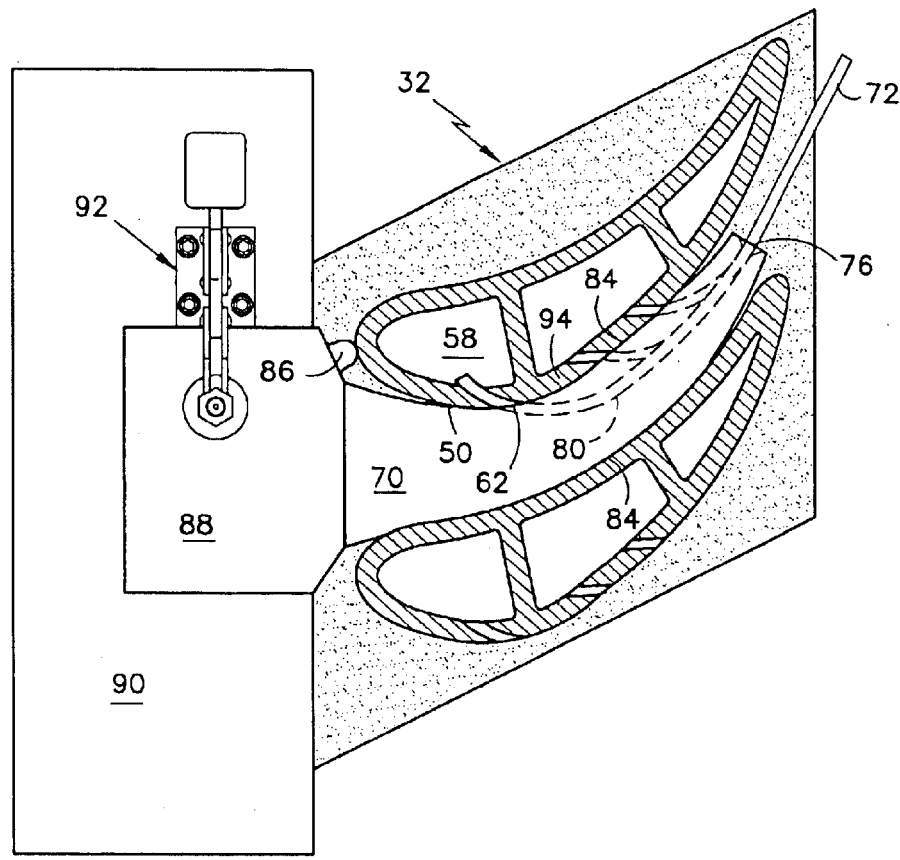
FIG. 6 is a sectional top view of a cast vane cluster of FIG. 2 showing a hole-drilling guide of FIG. 4 in place.

In one aspect of a hole-drilling method, shown in FIG. 6, a hole-drilling guide 70 is used to guide an EDM electrode 72 to a portion of an obstructed surface area 64 (shown in FIG. 3) of a vane cluster 32. In this example, the obstructed surface area is located on an airfoil convex fluid directing surface 50. A vane cluster 32 is loaded in a single or multiple axis EDM station using a conventional tooling fixture 90. In this example, an AMCHEM model HSD6-11, high-speed EDM station was used. A hole-drilling guide 70 is placed into a duct 56 (shown in FIG. 2) of the vane cluster 32 and accurately positioned in relation to the vane cluster 32 by conforming surfaces 84 and a locating feature 86. The hole-drilling guide 70 is rigidly secured by a clamp 92 contacting a clamping lug 88. An EDM electrode 72 is inserted into an inlet aperture 76 and advanced along a nonlinear raceway 80, until the electrode contacts the airfoil convex fluid directing surface 50. Once loaded into the raceway 80, the EDM electrode 72 is secured to the EDM station and plunged through an airfoil wall 94 into a hollow passage 58, forming a hole 62. Upon completion of the hole 62, the EDM electrode 72 is retracted and the process is repeated as required.

Figure 7:
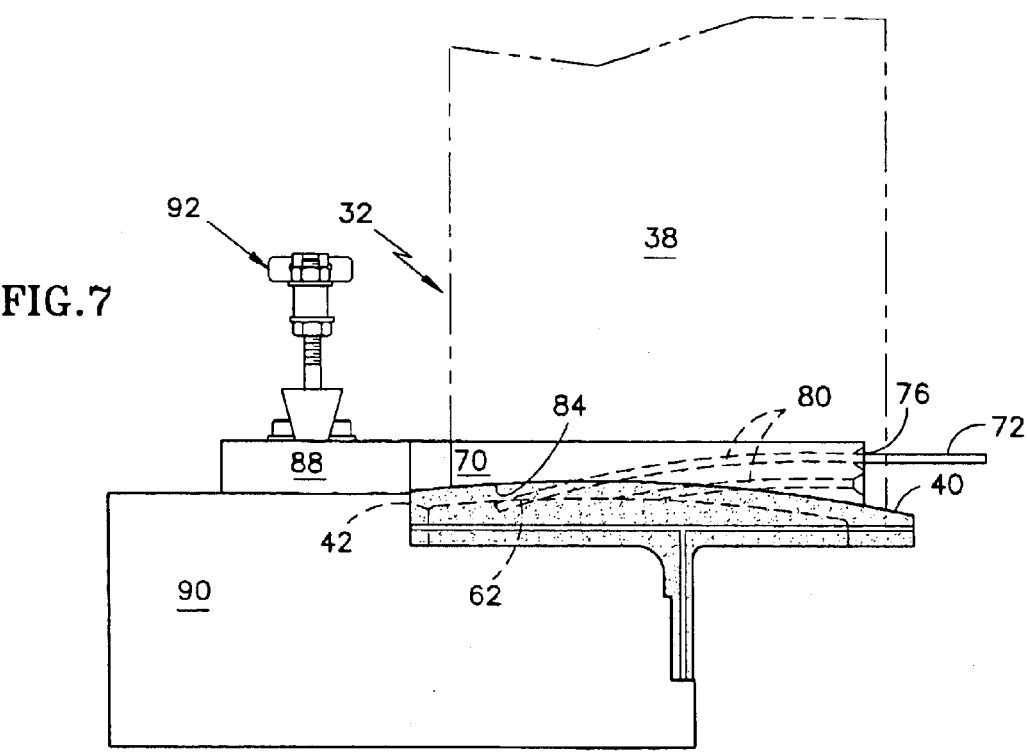
FIG. 7 is a sectional side view of a cast vane cluster of FIG. 2 showing a hole-drilling guide of FIG. 4 in place.

In another aspect of a hole-drilling method, shown in FIG. 7, a hole-drilling guide 70 is used to guide an EDM electrode 72 to a portion of an obstructed surface area 64 (shown in FIG. 3) of a vane cluster 32. In this example, the obstructed surface area is located on an inner endwall surface 40. A vane cluster 32 is loaded in a single or multiple axis EDM station using a conventional tooling fixture 90. In this example an AMCHEM model HSD6-11, high-speed EDM station or equivalent may be used. A hole-drilling guide 70 is placed into a duct 56 (shown in FIG. 2) of the vane cluster 32 and accurately positioned in relation to the vane cluster 32 by a conforming surface 84. The hole-drilling guide 70 is rigidly secured by a clamp 92 contacting a clamping lug 88. An EDM electrode 72 is inserted into an inlet aperture 76 and advanced along a nonlinear raceway 80, until the electrode contacts the inner endwall surface 40. Once loaded into the raceway 80, the EDM electrode 72 is secured to the EDM station and plunged through an inner platform 34 into an inner cavity 42 of the vane cluster 32, forming a hole 62. Upon completion of the hole 62, the EDM electrode 72 is retracted and the process is repeated as required.

Figure 8:
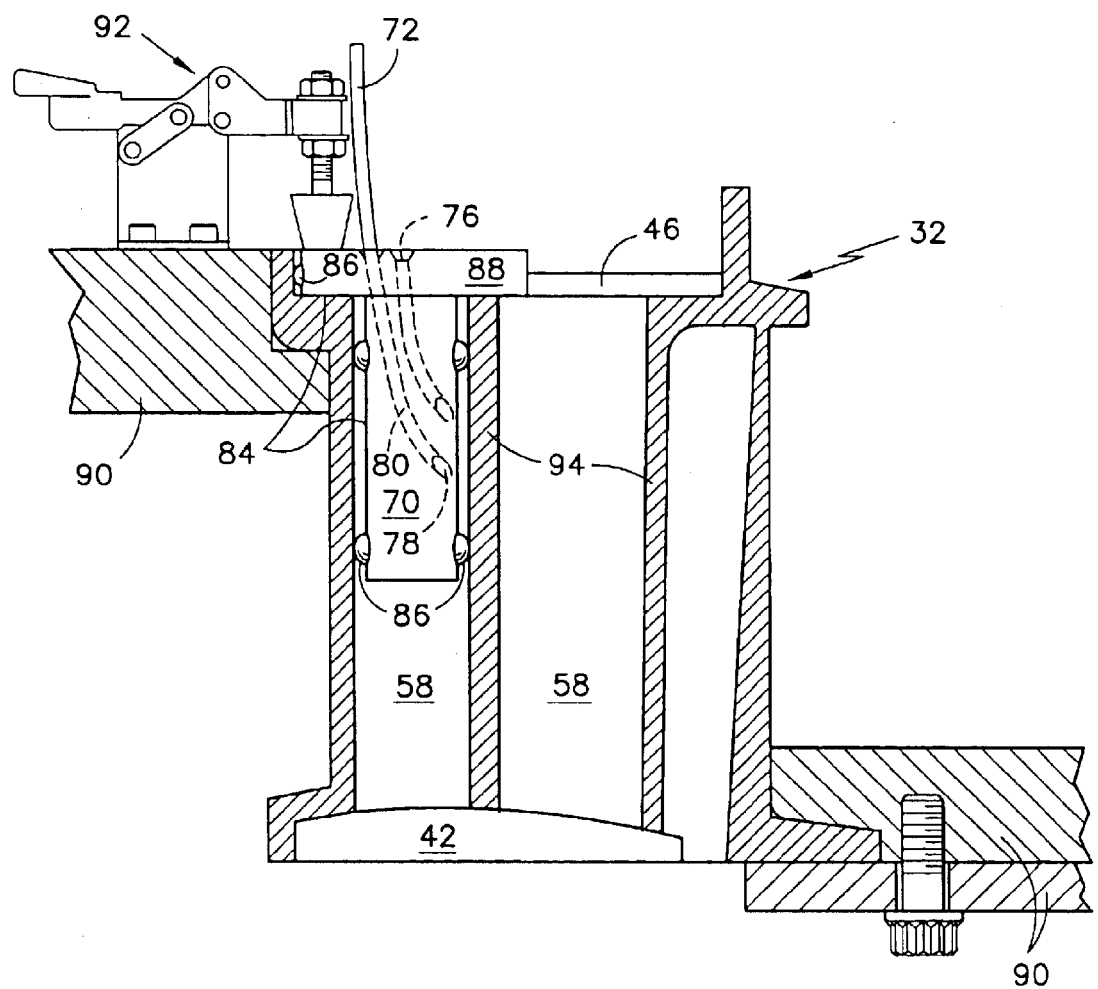
FIG. 8 is a sectional side view of a vane cluster of FIG. 2 showing a hole-drilling guide of FIG. 5 in place.

In yet another aspect of a hole-drilling method, shown in FIG. 8, a hole-drilling guide 70 guides an EDM electrode 72 to a portion of an obstructed surface area 64 (shown in FIG. 3) of a vane cluster 32. In this example, the obstructed surface area is located on an airfoil concave fluid directing surface 48, and is accessed via a hollow passage 58. A vane cluster 32 is loaded in a single or multiple axis EDM station using a conventional tooling fixture 90. In this example, an AMCHEM model HSD6-11, high-speed EDM station or equivalent may be used. A hole-drilling guide 70 is inserted into the hollow passage 58 of the vane cluster 32 and accurately positioned in relation to the hollow passage 58 by conforming surfaces 84 and locating features 86. The hole-drilling guide 70 is rigidly secured by a clamp 92 contacting a clamping lug 88. An EDM electrode 72 is inserted into an inlet aperture 76 and advanced along a nonlinear raceway 80, until the electrode contacts the surface of the hollow passage 58. Once loaded into the raceway 80, the EDM electrode 72 is secured to the EDM station and plunged through the airfoil wall 94, forming a hole 62 (not shown. Upon completion of the hole 62, the EDM electrode 72 is retracted and the process is repeated as required.

The foregoing examples have described an apparatus and method of drilling holes in surfaces without a line of sight from the drilling equipment to the hole location. While the invention has been described and illustrated in terms of drilling holes in obstructed surfaces of a gas turbine engine vane cluster, it should be understood that the invention may be used on any article requiring holes in obstructed surfaces. It will be apparent to those skilled in the art that various modifications thereto can be made without departing from the spirit and scope of the invention as described in the appended claims.

What is claimed is:

1. An apparatus for guiding a flexible hole-drilling instrument to an obstructed area of a surface, comprising:
   a body, wherein said body includes one or more external faces and is made of an electrically nonconductive material;
   an inlet aperture, wherein said inlet aperture penetrates a face of said body for inserting the flexible hole-drilling instrument;
   an exit aperture, wherein said exit aperture penetrates a face of said body; and
   a raceway extending through said body and linking said inlet and exit apertures, wherein said raceway has a cross sectional area and is nonlinear.

2. The apparatus of claim 1 wherein:
   said body further comprises a face substantially conforming to the obstructed area of the surface.

3. The apparatus of claim 2 wherein:
   said exit aperture penetrates said body through said substantially conforming face.

4. The apparatus of claim 3 further comprising:
   a locator on a face for contacting the surface and accurately positioning said exit aperture in relation to the obstructed area of the surface.

5. The apparatus of claim 4 wherein:
   said raceway cross sectional area is circular.

6. The apparatus of claim 3 wherein:
   said inlet aperture penetrates said body through a face other than said substantially conforming face.

7. The apparatus of claim 1 wherein:
   the electrically nonconductive material is a photocurable polymer.

* * * * *